United States Patent
Mathews et al.

(10) Patent No.: US 10,621,115 B2
(45) Date of Patent: Apr. 14, 2020

(54) SYSTEM AND METHOD FOR COMMUNICATION LINK MANAGEMENT IN A CREDIT-BASED SYSTEM

(71) Applicant: Apple Inc., Cupertino, CA (US)

(72) Inventors: Gregory S. Mathews, Saratoga, CA (US); Shane J. Keil, San Jose, CA (US); Lakshmi Narasimha Nukala, Pleasanton, CA (US)

(73) Assignee: Apple Inc, Cupertino, CA (US)

( * ) Notice: Subject to any disclaimer, the term of this patent is extended or adjusted under 35 U.S.C. 154(b) by 0 days.

(21) Appl. No.: 16/024,063

(22) Filed: Jun. 29, 2018

(65) Prior Publication Data
US 2020/0004700 A1 Jan. 2, 2020

(51) Int. Cl.
| | |
|---|---|
| *G06F 13/16* | (2006.01) |
| *G06F 15/17* | (2006.01) |
| *G06F 15/167* | (2006.01) |
| *G06F 13/40* | (2006.01) |

(52) U.S. Cl.
CPC ...... *G06F 13/1663* (2013.01); *G06F 13/4022* (2013.01); *G06F 15/167* (2013.01); *G06F 15/17* (2013.01)

(58) Field of Classification Search
None
See application file for complete search history.

(56) References Cited

U.S. PATENT DOCUMENTS

| | | | |
|---|---|---|---|
| 6,704,821 B2 | 3/2004 | Scandurra et al. | |
| 6,944,730 B2 | 9/2005 | Lai et al. | |
| 8,321,618 B1 * | 11/2012 | Keil | G06F 13/1605 710/310 |
| 9,411,774 B2 | 8/2016 | Campbell | |
| 2008/0316921 A1 * | 12/2008 | Mathews | H04L 47/10 370/230 |
| 2010/0198936 A1 | 8/2010 | Burchard et al. | |
| 2013/0019033 A1 * | 1/2013 | Shima | G06F 13/4059 710/34 |
| 2014/0036672 A1 * | 2/2014 | Kulkarni | H04L 47/22 370/230.1 |
| 2017/0187579 A1 * | 6/2017 | Borch | H04L 43/16 |
| 2019/0243700 A1 * | 8/2019 | Brewer | G06F 11/0763 |

* cited by examiner

*Primary Examiner* — Tracy C. Chan
(74) *Attorney, Agent, or Firm* — Kowert, Hood, Munyon, Rankin & Goetzel, P.C.; Erik A. Heter

(57) ABSTRACT

A system and method for communication link management in a credit-based system is disclosed. In one embodiment, a system includes first and second functional circuit blocks implemented on an integrated circuit and being able to communicate with one another through establishment of source synchronous links. The first functional circuit block includes a write queue for storing data and information regarding write requests sent from the second functional circuit block. The write queue includes credit management circuitry arranged to convey one or more credits to the second functional circuit block responsive to receiving one or more write requests therefrom. Responsive to receiving the one or more credits and in the absence of any pending additional requests, the second functional circuit block may deactivate a link with the first functional circuit block.

20 Claims, 4 Drawing Sheets

SYSTEM AND METHOD FOR COMMUNICATION LINK MANAGEMENT IN A CREDIT-BASED SYSTEM

BACKGROUND

Technical Field

This disclosure relates to computer systems, and more particularly, the managing of communications links within computer systems.

Description of the Related Art

In complex integrated circuits, such as those implementing a system on a chip (SoC), a large number of functional circuit blocks are typically present. These functional circuit blocks may communicate with each other through various mechanisms in accordance with the design of an SoC.

In some SoCs, communications links between various functional units may be source synchronous. That is, the source of a transaction (or originating functional circuit block) may convey a clock signal along with the information that is received by the destination (or receiving functional circuit block).

In addition to being source synchronous, some communications links within an SoC may have multiple virtual channels. These virtual channels may be defined by a class of the transactions that are conveyed in the communications link, with some transactions having a higher priority than others. Accordingly, a receiving unit in the SoC may handle received transactions based on their respective priorities.

SUMMARY

A system and method for communication link management in a credit-based system is disclosed. In one embodiment, a system includes first and second functional circuit blocks implemented on an integrated circuit and being able to communicate with one another through establishment of source synchronous links. The first functional circuit block includes a write queue for storing data and information regarding write requests sent from the second functional circuit block. The write queue includes credit management circuitry arranged to convey one or more credits to the second functional circuit block responsive to receiving one or more write requests therefrom. Responsive to receiving the one or more credits and in the absence of any pending additional requests, the second functional circuit block may deactivate a link with the first functional circuit block.

In one embodiment, the credits are used in a credit-based arbitration scheme used by an SoC implemented on the integrated circuit. When a requesting agent has credits, it may make requests, while in the absence of credits, no requests are made. A communications link in the SoC may have a number of virtual channels that are defined by transaction classes. Examples of transaction classes include latency sensitive traffic, bandwidth sensitive traffic, and best effort traffic. Each request therefore is associated with a transaction class and thus a corresponding virtual channel. An arbitration circuit in the first functional circuit block may arbitrate among requests in accordance with the respective classes, executing those requests having a higher priority over those with a lower priority. The credit management circuitry may return credits to an originator of the requests, and this may include sending credits for a desired type of transaction (e.g., sending more credits for high bandwidth transactions). Prior to deactivation of a communications link by a requesting agent, the credit management circuit may ensure that agent has a minimum number of credits so that, upon re-establishment of the link, it may issue new requests.

BRIEF DESCRIPTION OF THE DRAWINGS

The following detailed description makes reference to the accompanying drawings, which are now briefly described.

Figure 1:
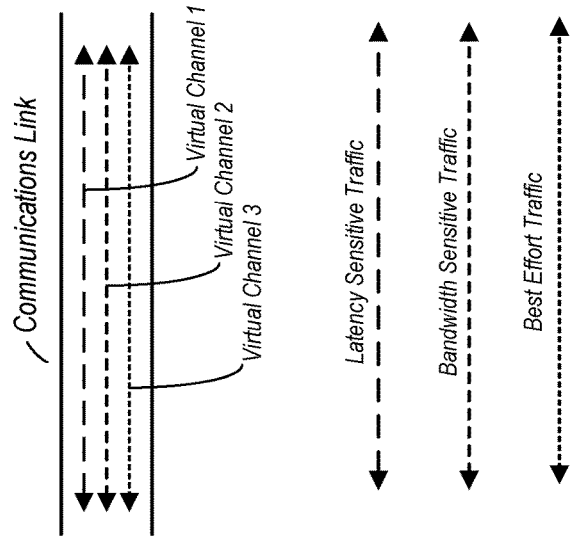
FIG. 1 is a block diagram of one embodiment of an example system having an SoC coupled to a memory.
Figure 1:
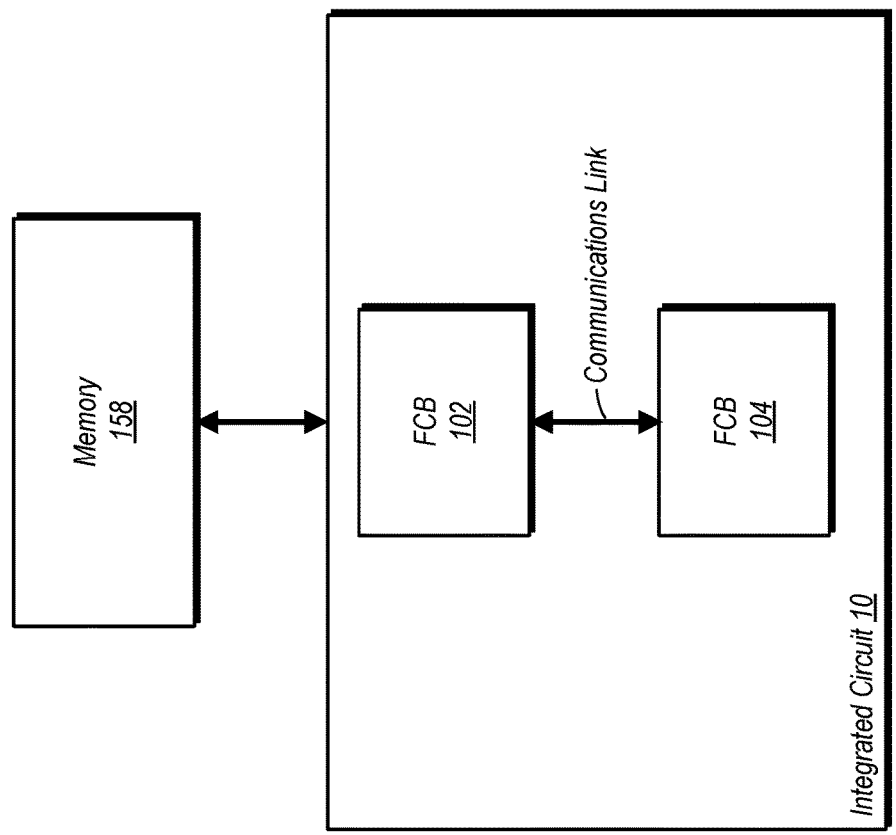

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Turning now to FIG. 1, a block diagram of one embodiment of an example system is shown. It is noted that this is a simplified diagram presented for the sake of illustration, and is not intended to be limiting in any way.

System 5 includes an integrated circuit 10 coupled to a memory 158. Other components may be present as well, although they are not explicitly shown here. Integrated circuit 10 in the embodiment shown is a system-on-a-chip (SoC). As shown here, integrated circuit 10 includes two functional circuit blocks (FCBs) 102 and 104, although additional circuit blocks may be present. The FCBs are coupled to one another via at least one communications link, which is a source synchronous link in this embodiment. Generally speaking, any two FCBs implemented on integrated circuit 10 may be coupled to one another by one or more communications links, which may be direct or indirect, and which may include source synchronous communications. Accordingly, each of the FCBs shown in FIG. 1 may have communications links with other FCBs that are not shown here.

The communications link as illustrated in FIG. 1 may include a number of virtual channels. In links with multiple virtual channels, the actual physical communications link is shared. Links having as few as one virtual channel are also possible and contemplated. Each of the virtual channels may be defined by a traffic class of the transactions that are conveyed on the link. Three examples of traffic classes (and thus, virtual channels) are shown here, although other traffic classes are possible and contemplated.

A first traffic class in the communications link of FIG. 1 is latency sensitive traffic. Transactions imitated in this class have latency requirements with regard to responses. For example, consider a request sent from FCB 104 to FCB 102 that falls under the class of latency sensitive traffic. A request sent by FCB 104 under this traffic class has a pre-defined latency by which it should receive a response from FCB 102 in this embodiment. Transactions under this class may have a higher priority than transactions of other classes when arbitrated.

A second traffic class in the communications link of FIG. 1 is bandwidth sensitive traffic. This type of traffic does not have strict latency requirements. However, the number of these transactions may be of a significant volume, and may require a certain amount of bandwidth be achieved over a time window. Transactions of this class may have a lower priority than latency sensitive traffic (example: if there is spare time in the window to achieve the required number of transactions) or a higher priority than the latency sensitive traffic (example: if there is little/no spare time in the window to achieve the required number of transactions) in this embodiment.

A third traffic class in the communications link of FIG. 1 is best effort traffic. Transactions of this type do not have strict latency requirements, and in some cases, may have no latency requirements. Furthermore, transactions of this type are such that they are not classified as bandwidth sensitive in accordance with the embodiment shown. Accordingly, transactions of this class may have a lower priority than latency sensitive and bandwidth sensitive traffic.

As will be discussed below, requests from one FCB to another may be conveyed under a particular transaction class (which may include any of those shown here, or others not explicitly discussed). In order to further manage traffic, credits may be provided to various FCBs to allow them to make requests. The credits may be general in some embodiments, or may be tied to a particular transaction class in other embodiments.

Figure 2:
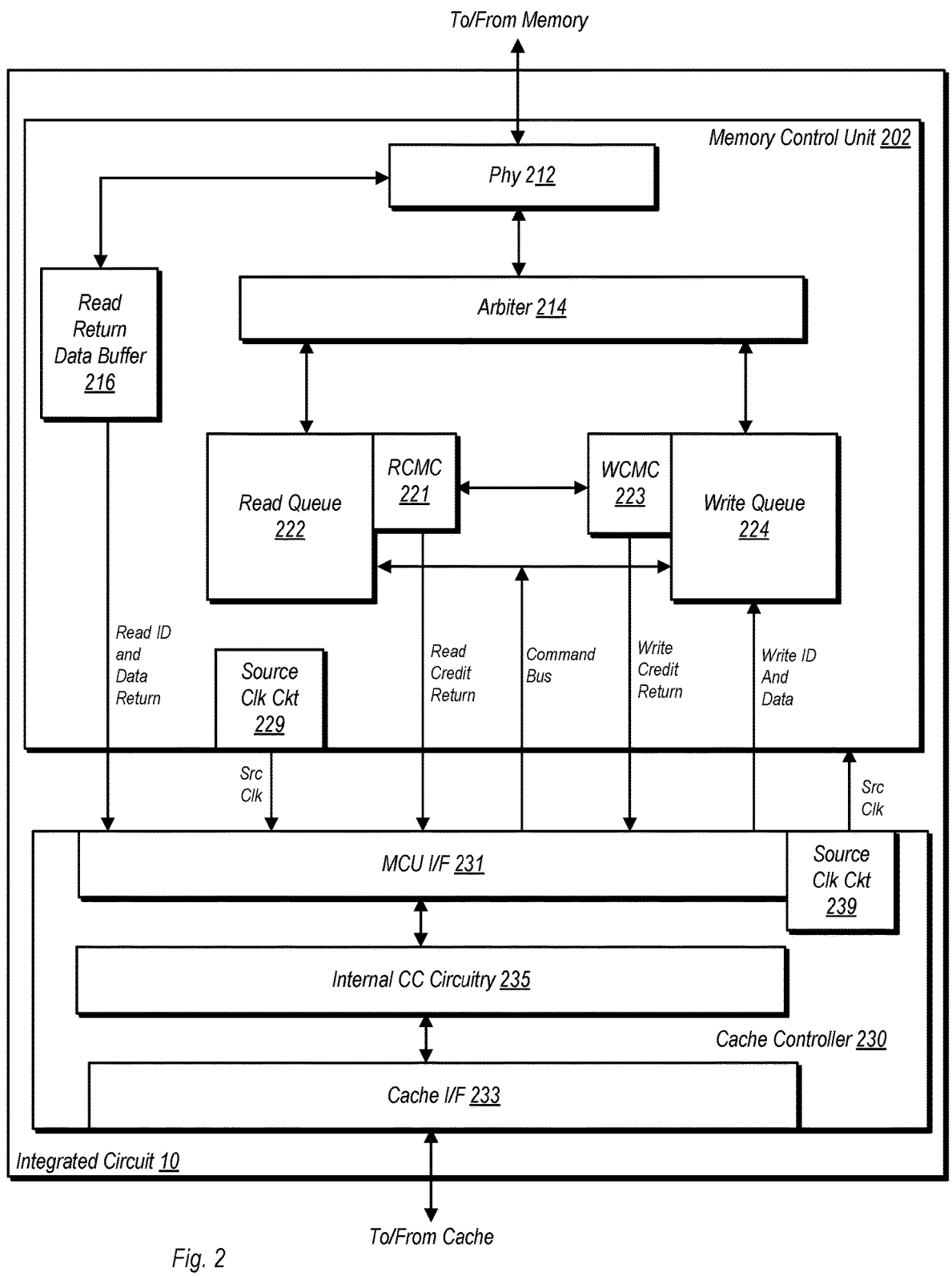
FIG. 2 is a block diagram of an SoC including a memory control circuit and a cache control circuit.

FIG. 2 is a block diagram of another embodiment of integrated circuit 10. In this particular embodiment, the functional circuit blocks are a memory control unit (MCU) 202 and a cache controller 230. It is noted that these two FCBs are shown here for the sake of example. However, much of the operation discussed below with regard to credits, virtual channels in a communications link, and source synchronous operation, may be performed by any two FCBs implemented on integrated circuit 10 and various embodiments thereof. It is additionally noted that the various signal paths connecting MCU 202 and cache controller 230 may be serial or parallel signal paths. For example, the paths conveying a source clock from one of these units to the other may be a single wire, while data paths and the command bus may, at least in some implementations, be multi-bit signal paths.

Cache controller 230 in the embodiment shown includes an MCU interface 231, which is used in the exchange of information with MCU 202. MCU interface 231 may include various circuits such as drivers, receivers, buffers, and any other circuitry that can be used to facilitate communications with MCU 202. Similarly, cache controller 230 also includes a cache interface 233 used to facilitate communications with one or more cache memories, which may be implemented at various levels (e.g., L1, L2, etc.). As with MCU interface 231, cache interface 233 may include circuitry such as drivers, receivers, buffers, and other circuits used in communication with a cache memory. Internal cache controller circuit 235, coupled between MCU interface 231 and cache interface 233, may include a number of different circuits used to manage the cache memories, maintain cache coherence, execute cache eviction policies, and so forth.

MCU 202 in the illustrated embodiment implements various circuits used to control and manage transactions that include reads from and writes to system memory. Cache controller 230 in the embodiment shown includes circuitry used to control and manage access one or more cache memories implemented on integrated circuit 10. These two units may be coupled to one another by one or more source synchronous communications links. As these links are source synchronous, they may be established by, among other things, conveying a clock signal from the source of the transaction to the destination. Similarly, a link may be deactivated (or shut down) by discontinuing the conveying of the clock signal from the source of the transaction to the destination. Additional actions may also be taken in some cases when a link is deactivated. At times during operation of integrated circuit 10, source synchronous links may be shut down in order to conserve power, particularly in portable system that utilized batteries as a power source.

MCU 202 in the embodiment shown includes a physical interface 212 that is coupled to a system memory when integrated circuit 10 is implemented in a system. Physical interface 212 includes various circuits used in communications with a memory that may be coupled to integrated circuit 10. Such circuits may include address circuitry, circuits for generating a data strobe signal, transmit circuitry (for conveying data to written to memory), receiver circuitry (for receiving data read from memory) and so on. Physical interface 212 is coupled to an arbiter 214, which arbitrates among transactions. In accordance with the discussion above, arbiter 214 in the embodiment shown arbitrates among transactions of the different transaction classes. For example, in performing arbitration between a latency sensitive request and a best effort request, arbiter 214 may select the latency sensitive request for execution.

Read queue 222 and write queue 224 are both coupled to arbiter 214. Read queue 222 in the embodiment shown is arranged to store read requests that are conveyed to MCU 202, including from cache controller 230. Each read request may indicate specific data (e.g., by address) to be read from a system memory, and may include other information regarding the request (e.g., traffic class). Read requests may be conveyed to integrated circuit 10 via a virtual channel in a communications link, and thus each has a particular traffic class. Arbiter 214 may select among the read requests in the queue and cause reads of memory to be performed based on the selected requests. The data that is read from memory may be conveyed to read return data buffer 216 (via physical interface 212), and subsequently to its intended destination (e.g., cache controller 230 as shown in this example). The read requests may be conveyed to read queue 222 via a command bus, as shown here.

Write queue 224 in the embodiment shown is arranged to store write requests conveyed from another FCB coupled to a communications link with integrated circuit 10, such as cache controller 230 shown in this example. Each write request may include an identifier, the actual data to be written, and other pertinent information. The request itself may be conveyed to write queue 224 via the command bus shown here, while the data and the write identifier are conveyed via a separate data path.

Both read and write requests are performed based on credits. Accordingly, MCU 202 includes a read credit management circuit (RCMC) 221 and a write credit management circuit (WCMC) 223. In order to convey a request in the embodiment shown, a requesting agent (e.g., cache controller 230) asserts a request based on available credits. In the absence of credits, an agent cannot initiate a request for that particular type. Credits are provided to an agent by RCMC 221 (for read requests) and WCMC 223 (for write requests). In some embodiments, credits may be directed to a specific transaction class, such as those discussed above. However, embodiments in which credits are generally read or write requests (without regard to transaction class) are also possible and contemplated.

When requests are conveyed to MCU 202 in the embodiment shown, the appropriate credit management circuit may, at least in some cases, return credits back to the requesting agent, thereby allowing it to make additional requests. In embodiments where requests are associated with particular transaction requests, a credit management circuit may provide credits to a requesting agent in a manner to control traffic and to enable arbiter 214 to operate more efficiently. For example, a credit management circuit may, in such embodiments, return more credits directed to a bandwidth sensitive traffic class than to other types given that more bandwidth sensitive requests may be sent than other types. In another example, a credit management circuit may immediately return one or more credits associated with latency sensitive traffic upon receiving one or more latency sensitive requests. In this manner, the credit management circuits may provide credits to a requesting agent in a manner that allows it to manage the number and types of incoming requests.

Each of the credit management circuits may also work to ensure that potential requesting agents have at least a minimum number of credits at a given time. In embodiments in which each credit corresponds to a traffic class, this may include ensuring that a potential requesting agent has a minimum number of credits of each type (or, at least a minimum number of each type that the agent can handle/process). Ensuring that a particular agent has at least a minimum number of credits may thereby ensure that the agent can initiate requests upon re-establishing a communications link. For example, if cache controller 230 indicates that it will be deactivating a communications link with MCU 202, the credit circuits therein may ensure that it first has a minimum number of credits of each type (and transaction class, if applicable). Thus, at some later time when cache controller 230 re-establishes the communications link with MCU 202, it will have credits to enable it to submit read and write requests.

Accordingly, the management of credits in the embodiment shown plays a role in determining when a communications link is to be deactivated. The deactivating of a communications link may be performed in order to save power. For example, if cache controller 230 wishes to deactivate a communications link with MCU 202, it may discontinue providing the clock signal from source clock circuit 239 to MCU 202. Since the signal path along which the clock signal is conveyed from cache controller 230 to MCU 202 can be relatively lengthy in terms of dimensions associated with integrated circuit features, it may provide an amount of capacitance that is significant. This in turn causes greater power consumption and heat generation when the source clock (Src Clk) signal is conveyed to MCU 202. Therefore, inhibiting transmission of the source clock signal from cache controller 230 to MCU 202 when the link is inactive may save a significant amount of power. When the link between cache controller 230 and MCU 202 is deactivated, MCU 202 may also cause the source clock signal from source clock circuit 229 to be inhibited.

The communications link between MCU 202 and cache controller 230 may be deactivated when there are no pending transactions between these two units. For example, cache controller 230 may send a number of write requests to MCU 202, along with data corresponding to each request. Upon their receipt, the requests and corresponding data are stored in write queue 224, and WCMC 223 may return credits to cache controller 230. If there are no pending read requests (as defined by read data not having been returned to cache controller 230) and there are no additional write requests to be made, the communications link between MCU 202 and cache controller 230 may be deactivated. This applies even if the write requests have not been fully executed; as long as the requests and data are stored in write queue 224, cache controller 230 does not require the link to remain active in the absence of additional pending requests. Therefore, cache controller 230 may deactivate the link when write requests have not been fully executed, since it no longer has a role in these requests once they and corresponding data has been queued. If any read requests are pending (but there are no further write requests), cache controller 230 in the embodiment shown will wait until the requested data is provided before deactivating the communications link.

Prior to deactivation, cache controller 230 may provide an indication of the pending deactivation to MCU 202. As part of the link deactivation process, the credit management circuits may determine if cache controller has a minimum number of credits, both read and write (and for each transaction class, if applicable). If a credit management circuit determines that cache controller 230 does not have a minimum number of credits of a particular type, it may provide additional credits (e.g., obtained from a free list, or list of unassigned credits, within a credit management circuit) to cache controller 230. If it is determined that cache controller has at least the minimum number of credits of each type, an indication may provide to cache controller 230. Thereafter, cache controller may deactivate the source synchronous communications link to MCU 202. This includes inhibiting the source clock signal from being provided by source clock circuit 239 to MCU 202. In some embodiments, additional actions may be taken, such as powering down at least some of the circuits in MCU interface 231. For example, any drivers or receivers used in communications with MCU 202 may be powered down when the link is not active. In some embodiments, MCU 202 may also inhibit the source clock signal generated by source clock circuit 229 from being provided to cache controller 230 as part of the link deactivation procedure.

Either MCU 202 or cache controller 230 may perform actions to re-establish the communications link when it is otherwise inactive. For example, cache controller 230 may respond to a need for access to system memory (e.g., for a write back of information stored in a cache) by activating the source clock signal to be provided to MCU 202 by source clock circuit 239. MCU 202 may take similar actions to re-establish the communications link with cache controller 230.

Figure 3:
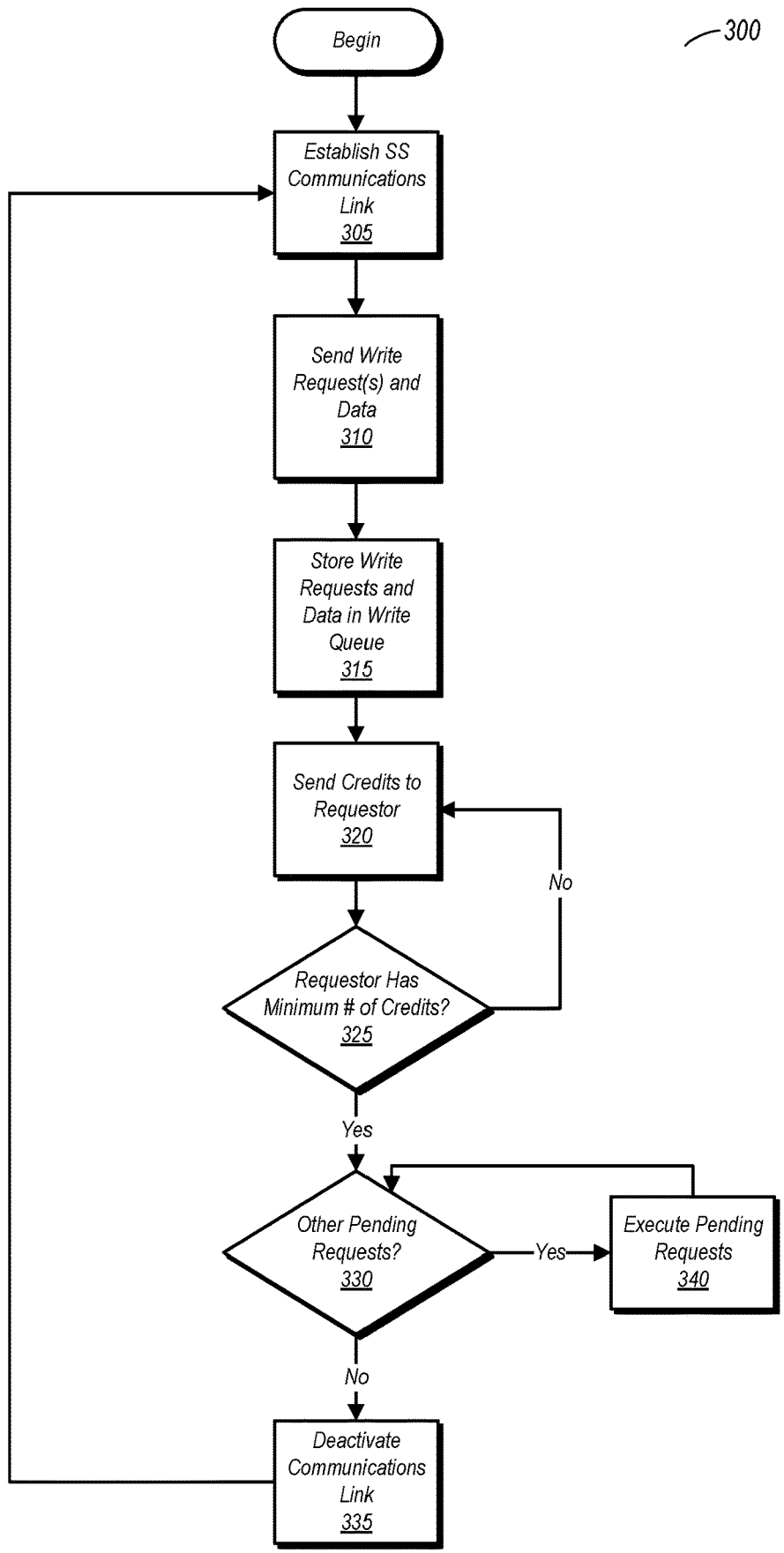
FIG. 3 is a flow diagram of one embodiment of a method for managing communications links in a credit-based system.

FIG. 3 is a flow diagram of one embodiment a method for managing communications links in a credit-based system. Method 300 may be used with either of the hardware embodiments discussed above, as well as embodiments not explicitly disclosed herein. Such embodiments may thus fall within the scope of this disclosure.

Method 300 begins with the establishment of a source synchronous communications link between two different agents (block 305). Following the establishment of the link, one of the agents, a requestor, may send requests to the other agent. Such requests may include write requests, which are sent along with the data to be written (block 310). The sending of requests consumes credits awarded to the originating agent.

Upon receipt of the write request by the receiving agent, the request and its corresponding data are stored in a write queue (block 315). Thereafter, credit management circuitry in the receiving agent may send credits back to the requestor (block 320). Receiving these credits allows the requestor to initiate additional requests at a future time.

Prior to any deactivation of a communications link, a credit management circuit may ensure that the requesting agent has a minimum number of credits. If the requestor does not have the minimum number of credits (block 325, no), then the method returns to block 320 and additional credits are provided. If the requestor has the minimum number of credits (block 325, yes), and there are no other pending requests (block 330, no), then the communications link may be deactivated (block 335). However, if additional requests are pending (block 330, yes), those requests may be executed (in the case of read requests) or otherwise sent by the requestor (in the case of write requests) prior to deactivating the communications link. Once the link has been deactivated, it may remain idle for some time, and subsequently reactivated (at block 305).

Figure 4:
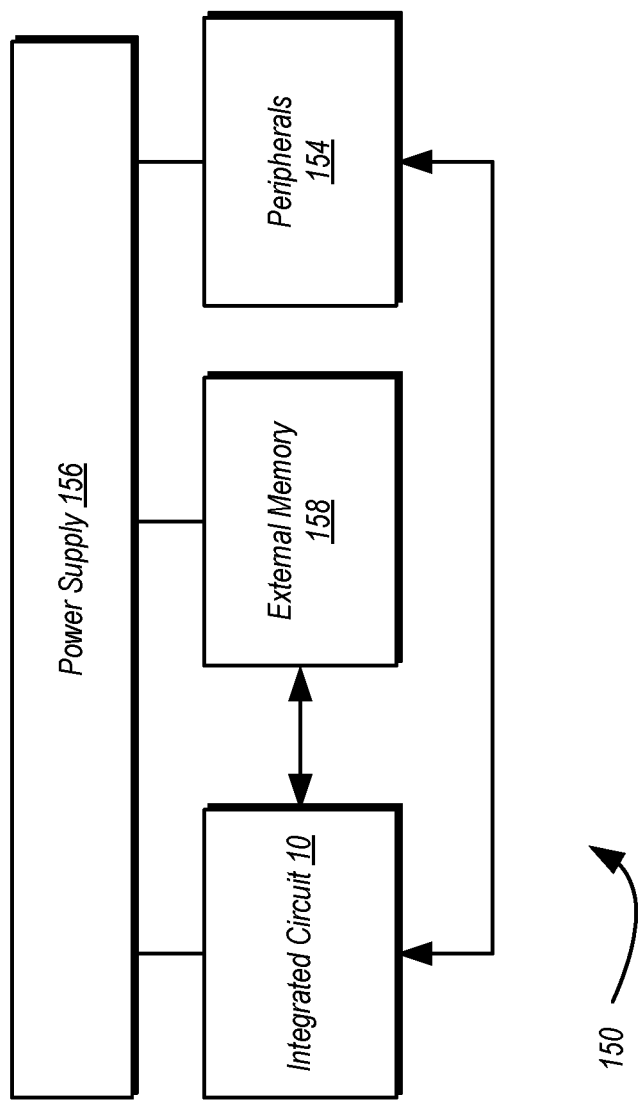
FIG. 4 is a block diagram of one embodiment of an example system.

Turning next to FIG. 4, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
a first functional circuit block implemented on an integrated circuit; and
a second functional circuit block implemented on the integrated circuit, wherein the second functional circuit block is configured to establish a source-synchronous communications link with the first functional circuit block;
wherein the first functional circuit block includes a write queue configured to store data and information regarding write requests sent from the second functional circuit block, wherein the write queue includes credit management circuitry configured to convey one or more credits to the second functional circuit block responsive to receiving one or more write requests therefrom; and
wherein the second functional circuit block is configured to, responsive to receiving the one or more credits and in an absence of additional requests, deactivate the communications link, wherein the credit management circuitry is configured to guarantee that the second functional circuit block has at least a minimum number of credits prior to deactivating the communications link.

2. The apparatus as recited in claim 1, wherein deactivating the communications link comprises the second functional circuit block discontinuing conveying a clock signal to the first functional circuit block.

3. The apparatus as recited in claim 1, wherein deactivating the communications link comprises the second functional circuit block powering down one or more circuits providing an interface with the first functional circuit block.

4. The apparatus as recited in claim 1, wherein the first functional circuit block is coupled to a memory, wherein the first functional circuit block is configured to write, to the memory, data associated with write requests.

5. The apparatus as recited in claim 1, wherein the communications link includes a plurality of virtual channels, wherein each of the virtual channels is defined by a transaction class.

6. The apparatus as recited in claim 5, wherein the first functional circuit block includes an arbitration unit, wherein the arbitration unit is configured to respond to requests having a first transaction class prior to responding to requests having a second transaction class.

7. The apparatus as recited in claim 1, wherein the first functional circuit block includes a read queue configured to store read requests transmitted to the first functional circuit block from the second functional circuit block, wherein the first functional circuit block is configured to return data to the second functional circuit block responsive to executing a read request sent from the second functional circuit block.

8. The apparatus as recited in claim 7, wherein the second functional circuit block is configured to deactivate the communications link in an absence of any pending write requests sent to the first functional circuit block and responsive to receiving data for any pending read requests sent to the first functional circuit block.

9. The apparatus as recited in claim 5, wherein:
transactions conveyed via a first one of the plurality of virtual channels are latency sensitive transactions having a pre-defined latency for completing a given transaction;
transactions conveyed via a second one of the plurality of virtual channels are bandwidth sensitive transactions in which a pre-determined number of transactions are to be completed within a given time window; and
transactions conveyed via a third one of the plurality of virtual channels are best effort transactions having a lower priority than latency sensitive transactions and bandwidth sensitive transactions.

10. A method comprising:
establishing a communications link to a first functional circuit block from a second functional circuit block, the communications link being a source synchronous communications link;
sending one or more write requests and data corresponding to each of the one or more write requests from the second functional circuit block to the first functional circuit block;
storing each of the one or more write requests and data corresponding to each of the one or more write requests in a write queue implemented in the first functional circuit block;
conveying one or more credits to the second functional circuit block from credit management circuitry implemented in the first functional circuit block;
guaranteeing, by the credit management circuitry, that the second functional circuit block has at least a minimum number of credits prior to deactivating the communications link; and
responsive to receiving the credits and determining that there are no pending requests, the second functional circuit block deactivating the communications link.

11. The method as recited in claim 10, wherein deactivating the communications link comprises the second functional circuit block discontinuing conveying a clock signal to the first functional circuit block.

12. The method as recited in claim 10, wherein the communications link includes a plurality of virtual channels, wherein each of the virtual channels is defined by a transaction class, wherein each transaction class has a unique priority level with respect to other transaction classes.

13. The method as recited in claim 10, wherein the communications link comprises a plurality of virtual channels, wherein each of the virtual channels is defined by a transaction class, and wherein the method further comprises an arbitration circuit in the first functional circuit block arbitrating among requests based on the transaction class of each.

14. The method as recited in claim 10, further comprising:
the second functional circuit block conveying one or more read requests to the first functional circuit block;
the first functional circuit block storing the one or more read requests in a read queue; and the first functional circuit block providing data to the second functional circuit block responsive to executing one of the one or more read requests.

15. The method as recited in claim 12, further comprising:
conveying transactions in a first one of the plurality of virtual channels according to a first transaction class, wherein transactions of the first transaction class are latency sensitive transactions having a pre-defined latency for completing a given transaction;
conveying transactions in second one of the plurality of virtual channels according to a second transaction class, wherein transactions of the second transaction class are bandwidth sensitive transactions in which a pre-determined number of transactions are to be completed within a given time window; and
conveying transactions in a third one of the plurality of virtual channels according to a third transaction class, wherein transactions of the third transaction class are best effort transactions having a lower priority than latency sensitive transactions and bandwidth sensitive transactions.

16. An integrated circuit comprising:
a memory control circuit; and
a cache controller circuit coupled to the memory control circuit, wherein the cache control circuit is configured to establish a source synchronous communications link with the memory control circuit;
wherein the memory control circuit includes a write queue configured to store data and information corresponding write requests conveyed by the cache controller circuit, and further includes credit management circuitry configured to convey one or more credits to the cache controller circuit responsive to receiving one or more write requests from the cache controller circuit; and
wherein the cache control circuit is configured to, responsive to receiving the one or more credits and in an absence of any pending requests, deactivate the communications link, wherein the credit management circuitry is configured to guarantee the cache control circuit has at least a minimum number of credits prior to deactivating the communications link.

17. The integrated circuit as recited in claim 16, wherein the cache control circuit is configured to deactivate the communications link by discontinuing conveying a clock signal to the memory control circuit.

18. The integrated circuit as recited in claim 16, wherein the communications link includes a plurality of virtual channels, wherein each of the virtual channels is defined by a transaction class, and wherein each request conveyed from the cache control circuit to the memory control circuit has a transaction class, and wherein the memory control circuit further includes an arbitration circuit configured to arbitrate among request according to their respective transaction classes.

19. The integrated circuit as recited in claim 16, wherein the memory control circuit further includes a read queue configured to store read requests conveyed thereto from the cache control circuit, wherein the memory control circuit is configured to, responsive to executing a read request, read data from a memory coupled to the memory control circuit and provide the data to the cache control circuit.

20. The integrated circuit as recited in claim 18, wherein:
transactions conveyed via a first one of the plurality of virtual channels are latency sensitive transactions having a pre-defined latency for completing a given transaction;
transactions conveyed via a second one of the plurality of virtual channels are bandwidth sensitive transactions in which a pre-determined number of transactions are to be completed within a given time window; and
transactions conveyed via a third one of the plurality of virtual channels are best effort transactions having a lower priority than latency sensitive transactions and bandwidth sensitive transactions.

* * * * *